(12) United States Patent
Wischik et al.

(10) Patent No.: US 8,464,233 B2
(45) Date of Patent: Jun. 11, 2013

(54) COMPILE TIME INTERPRETATION OF MARKUP CODES

(75) Inventors: Lucian Jules Wischik, Seattle, WA (US); Avner Y. Aharoni, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 478 days.

(21) Appl. No.: 12/819,404

(22) Filed: Jun. 21, 2010

(65) Prior Publication Data
US 2011/0314460 A1 Dec. 22, 2011

(51) Int. Cl.
*G06F 9/45* (2006.01)

(52) U.S. Cl.
USPC ............ 717/151; 717/117; 717/148; 709/234

(58) Field of Classification Search
USPC .................. 717/106–123; 709/224, 230, 245, 709/247; 715/234–242
See application file for complete search history.

(56) References Cited

U.S. PATENT DOCUMENTS

| | | | |
|---|---|---|---|
| 5,923,880 A | 7/1999 | Rose et al. | |
| 6,578,192 B1 * | 6/2003 | Boehme et al. | 717/115 |
| 6,671,853 B1 * | 12/2003 | Burkett et al. | 715/235 |
| 6,754,884 B1 * | 6/2004 | Lucas et al. | 717/108 |
| 6,799,184 B2 | 9/2004 | Bhatt | |
| 6,918,107 B2 * | 7/2005 | Lucas et al. | 717/124 |
| 6,925,631 B2 | 8/2005 | Golden | |
| 6,938,204 B1 | 8/2005 | Hind | |
| 6,981,212 B1 | 12/2005 | Claussen | |
| 7,096,455 B2 | 8/2006 | Santiago | |
| 7,114,123 B2 | 9/2006 | Chen | |
| 7,191,433 B2 | 3/2007 | Narad et al. | |
| 7,210,138 B2 | 4/2007 | Zatloukal et al. | |
| 7,266,766 B1 | 9/2007 | Claussen | |
| 7,401,327 B2 | 7/2008 | Halstead et al. | |
| 7,665,073 B2 | 2/2010 | Meijer | |
| 2002/0026447 A1 * | 2/2002 | Matsutsuka et al. | 707/103 Y |
| 2002/0095658 A1 | 7/2002 | Shulman et al. | |
| 2002/0133812 A1 | 9/2002 | Little et al. | |
| 2002/0184264 A1 | 12/2002 | Berg | |

(Continued)

FOREIGN PATENT DOCUMENTS
WO WO02063438 8/2002

OTHER PUBLICATIONS

Doucet et al., Introspection in System-Level Language Frameworks: Meta-level vs. Integrated, IEEE, 2003, pp. 1-6.*

(Continued)

*Primary Examiner* — Wei Zhen
*Assistant Examiner* — Satish Rampuria
(74) *Attorney, Agent, or Firm* — Workman Nydegger

(57) ABSTRACT

The present invention extends to methods, systems, and computer program products for compile time interpretation of markup codes. Embodiments of the invention can be used to specify custom behaviors to be taken in response to any of a number of ways that markup codes (e.g., XML data) can be constructed and in response to any number of ways that markup codes can be accessed. At compile time, the construction of objects and/or the modes of access for objects using mark up codes are known. As such, the compiler, type-system and development environment can use a known set of custom behaviors to regulate or give feedback on what constructions or modes of access are allowed, and what their characteristics are.

20 Claims, 3 Drawing Sheets

U.S. PATENT DOCUMENTS

| | | | |
|---|---|---|---|
| 2003/0163603 | A1 | 8/2003 | Fry |
| 2004/0117776 | A1 | 6/2004 | Pazandak |
| 2004/0193575 | A1 | 9/2004 | Chen |
| 2004/0194057 | A1 | 9/2004 | Schulte |
| 2005/0216885 | A1* | 9/2005 | Ireland .......................... 717/108 |
| 2006/0074734 | A1* | 4/2006 | Shukla et al. ..................... 705/8 |
| 2006/0130128 | A1* | 6/2006 | Gorancic et al. .................. 726/9 |
| 2007/0043760 | A1* | 2/2007 | Johannes Maria Meijer et al. ............................. 707/102 |
| 2008/0010629 | A1 | 1/2008 | Berg |
| 2011/0072413 | A1 | 3/2011 | Meijer |

OTHER PUBLICATIONS

Maruyama et al., A CASE Tool Platform Using an XML Representation of Java Source Code, IEEE, 2004, pp. 1-10.*

McRitchie et al., Managing Component Variability within Embedded Software Product Lines via Transformational Code Generation, Springer-Verlag Berlin Heidelberg 2004, pp. 98-100.*

The Flexible XML-based Languages (FXL) Project, "FXL Project-Introduction", 2006, 2 pages.

Kirkegaard, Christian, et al., "Static Analysis of XML Transformations in Java", IEE Transactions on Software Engineering, 2004, 16 pages.

Wildermuth, Shawn, MSDN, "Textual Domain Specific Languages for Developers—Part 1", Feb. 2009, 11 pages.

Reuter, Florian, et al., "STAX/bc: A binding compiler for event-based XML data binding APIs", Jan. 2004, 9 pages.

www.brics.dk, "Static Validation of Dynamically Generated XML Documents", Based on information and belief available, at least as early as Apr. 8, 2010, 9 pages.

Castor, "Using Castor XML", 2005, 6 pages.

Obasanjo, Dare, Integrating XML into Popular Programming Languages, Jan. 13, 2005, 11 pages.

Meijer, Erik; Shulte, Wolfram, Unifying Tables, Objects and Documents, Aug. 2003, 24 pages.

Li, et al. "Compiler Support for Efficient Processing of XML Datasets", Jun. 2003, ACM, pg. 42-52.

Fu, et al. "Model Checking XML Manipulating Software", Jul. 2004, ACM, pg. 252-262.

Lovett, et al. "SML END TAG-RE: </> as end tag", Nov. 1997, retrieved from online: http://www.stylusstudio.com/xmldev/199711/pos40000.html, pg. 1-3.

Office Action cited in U.S. Appl. No. 11/209,067 dated Sep. 29, 2008.
Office Action cited in U.S. Appl. No. 11/209,067 dated May 6, 2009.
Office Action cited in U.S. Appl. No. 11/209,067 dated Feb. 24, 2010.
Notice of Allowance cited in U.S. Appl. No. 11/209,067 dated Sep. 2, 2010.
Notice of Allowance cited in U.S. Appl. No. 11/209,067 dated Jan. 18, 2011.
Office Action cited in U.S. Appl. No. 12/955,680 dated Apr. 30, 2012.
Notice of Allowance cited in U.S. Appl. No. 12/955,680 dated Nov. 8, 2012.
Office Action cited in U.S. Appl. No. 11/108,455 dated Oct. 30, 2008.
Office Action cited in U.S. Appl. No. 11/108,455 dated Jun. 8, 2009.
Notice of Allowance cited in U.S. Appl. No. 11/108,455 dated Oct. 13, 2009.

* cited by examiner

COMPILE TIME INTERPRETATION OF MARKUP CODES

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Extensible Markup Language ("XML") and HyperText Markup Language ("HTML") are common data formats for described tree-structured data. XQuery, Extensible Stylesheet Language Transformations ("XSLT"), and XML APIs are common mechanisms used to access tree-structured data. It is common for XML to be used to describe instances of types, data structures, and their behaviors that can be used also in general purpose languages. Using XML in this way is often referred to as "XML based DSL (Domain specific language").

When working with these types, data structures and behaviors, developers have two relatively common approaches when attempting to integrate XML with general purpose programming languages (e.g., C#, Visual Basic, etc.). One approach is to use the general purpose language in the conventional imperative way and enjoy the other facilities of the languages including the development environment. However at least one drawback to this approach is the need to use imperative code and the limitations of the general purpose language type system.

Another approach is to use the XML based DSL option that provides more declarative experience and the ability to create new semantics. However at least one drawback to this other approach is that it requires special steps to integrate it within applications that are written in general purpose languages. This can result in poor usability and in some cases expensive integration costs. More specifically, this other approach can involve one or more of: inefficiencies, inflexibility, loss of fidelity, loss of type-safety, extra runtime components or tools, extra compilation-time steps, extra layers of indirection or mutability, requiring an exact 1-1 mapping between XML and the programming language data-structures, and not allowing language entities to be a part of the XML data.

Various techniques have been used to address drawbacks of XML based DSL. However, these techniques are implemented at run time, after code has been compiled. Other techniques are implemented prior to compile time in a prior step.

BRIEF SUMMARY

The present invention extends to methods, systems, and computer program products for compile time interpretation of markup codes. One or more portions of programming language source code are accessed. The one or more portions of programming language source code include some markup codes. Further code is declared and/or accessed. The further code defines relationships between specified code constructs and the included markup codes. The specified code constructs are code constructs that are to be referenced or executed when the included markup codes are encountered during compilation.

The one or more portions of source code are compiled along with the declared and/or accessed further code. During compilation, a specified markup code is encountered within the portion of source code. A relationship between the specified markup code and a specified code construct is identified from within the declared and/or accessed further code. The specified code construct is to be referenced or executed when the specified markup code is encountered during compilation. The specified code construct is called or a call is emitted to the specified code construct.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
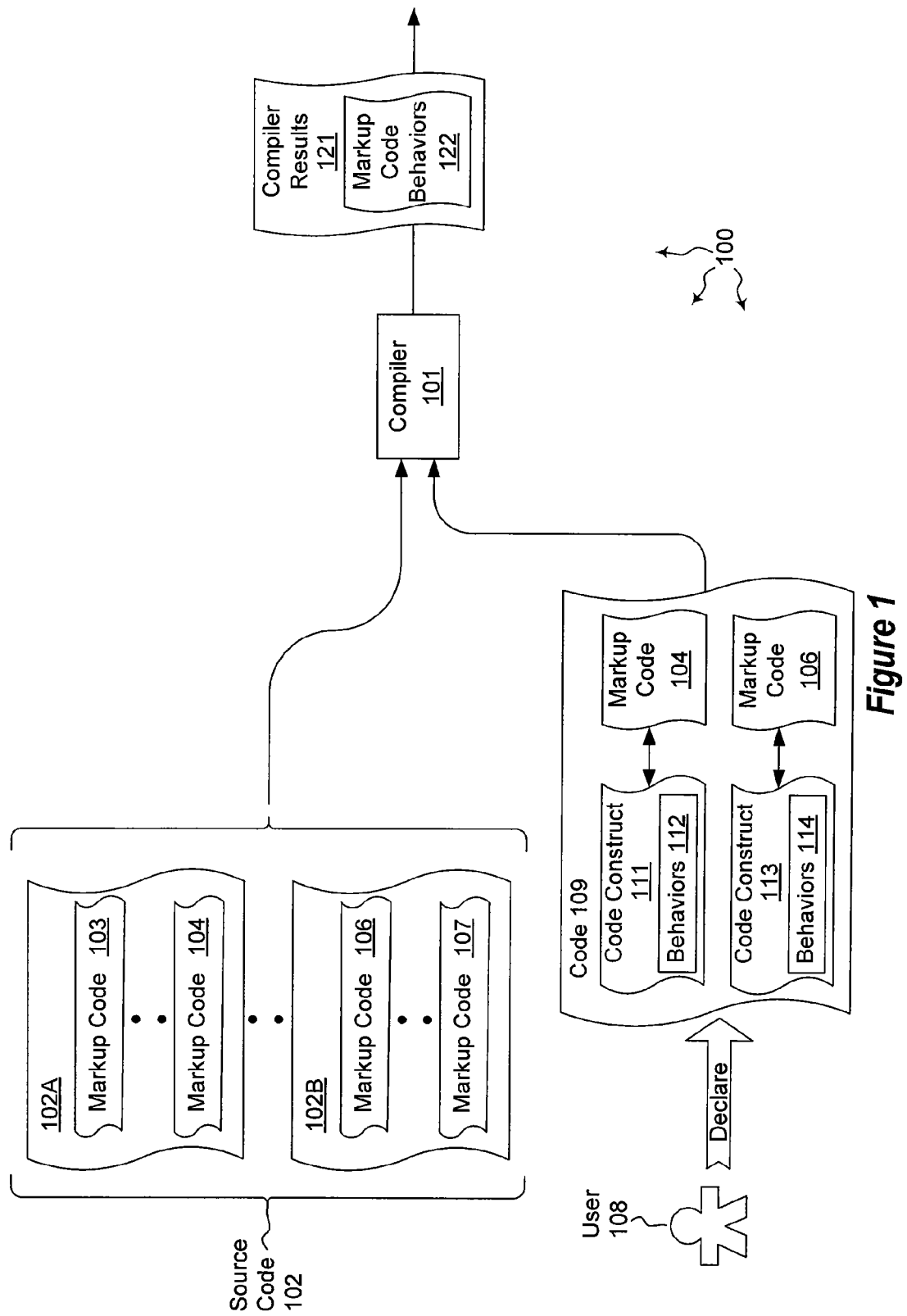
FIG. 1 illustrates an example computer architecture that facilitates compile time interpretation of markup codes.

The present invention extends to methods, systems, and computer program products for compile time interpretation of markup codes. One or more portions of programming language source code are accessed. The one or more portions of programming language source code include some markup codes. Further code is declared and/or accessed. The further code defines relationships between specified code constructs and the included markup codes. The specified code constructs are code constructs that are to be referenced or executed when the included markup codes are encountered during compilation.

The one or more portions of source code are compiled along with the declared and/or accessed further code. During compilation, a specified markup code is encountered within the portion of source code. A relationship between the specified markup code and a specified code construct is identified from within the declared and/or accessed further code. The specified code construct is to be referenced or executed when the specified markup code is encountered during compilation. The specified code construct is called or a call is emitted to the specified code construct.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Generally, embodiments of the invention permit a programmer to specify custom behaviors to be taken in response to any of a number of ways that markup codes (e.g., XML data) can be constructed and in response to any number of ways that markup codes can be accessed. When the construction of objects using markup codes is known at compile-time, or the modes of access are known at compile-time, then the compiler, type-system and development environment can use the known set of custom behaviors to regulate or give feedback on what constructions or modes of access are allowed, and what their characteristics are.

FIG. 1 illustrates an example computer architecture 100 that facilitates compile time interpretation of markup codes. Referring to FIG. 1, computer architecture 100 includes compiler 101, user 108, source code 102, code 109, and compiler results 121. Each of the depicted components and data elements can be connected to one another over a system bus and/or over (or be part of) a network, such as, for example, a Local Area Network ("LAN"), a Wide Area Network ("WAN"), and even the Internet. Accordingly, each of the depicted components and data elements as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the system bus and/or network.

Source code 102 includes various different code portions, including code portions 102A, 102B, etc. Different code portions can be stored at the same and/or at different locations (e.g., on a network). Each code portion can include a combination of source code (not shown) intermixed with markup codes.

Source code in a code portion can include programming instructions from a programming language, such as, for example, C#, C++, Visual Basic, etc. Different code portions can include programming instructions from the same and/or different programming languages. For example, code portion 102A and code portion 102B can include programming language instructions from the same and/or different programming languages.

Markup codes in a code portion can be from a markup language, such as, for example, a presentational, a procedural, or a descriptive markup language. In some embodiments, markup codes are from one or more of: eXstensible Markup Language ("XML"), HyperText Markup Language (HTML), and eXstensible HyperText Markup Language (XHTML).

Code 109 can be source code including programming instructions of a programming language, such as, for example, C#, C++, Visual Basic, etc. Code 109 and code portions 102A, 102B, etc. can include programming instructions from the same and/or different programming languages. Code 109 also indicates relationships between code constructs included in code 109 and markup codes included in source code 102. The code constructs can define behaviors for interpreting the meaning of encountered markup codes. For example, code construct 111 defines behaviors 112 for interpreting the meaning of markup code 104 (e.g., when markup code 104 is encountered during compilation). Similarly, code construct 113 defines behaviors 114 for interpreting the meaning of markup code 106 (e.g., when markup code 106 is encountered during compilation).

Alternately, code 109 can be binary (e.g., executable) code indicating relationships between code constructs included in code 109 and markup codes included in source code 102.

In some embodiments, users declare their own code for interpreting markup codes. For example, user 108 can author code 109 and then access code 109 to interpret markup codes included in source code 102. In other embodiments, users access previously developed code for interpreting markup codes. For example, user 108 can access code 109 to interpret markup codes included in source code 102, even when user 108 did not author code 109.

Generally, compiler 101 is configured to access source code and compiles the source code into compiler results (e.g., compiler results 121). Compiler results can include one or more of: executable code, intermediate language instructions, and further source code. In some embodiments, compiler results indicate behaviors of markup codes in programming language instructions of a programming language. For example, compiler 101 can represent behaviors of XML codes in C# instructions.

Generally, compiler 101 can represent markup code behaviors (e.g., markup code behaviors 122) defined in other code. For example, compiler 101 can represent behaviors for markup code 104 based on behaviors 112.

During compilation, when compiler 101 encounters a markup code, compiler 101 can refer to identified relationships between the markup code and corresponding code constructs. Compiler 101 can execute the corresponding code construct or emit a call to the corresponding code construct to implement defined behaviors for the markup code. For example, upon encountering markup code 104, compiler 101 can refer to code 109 to identify a relationship between code construct 111 and markup code 104. Compiler 101 can then emit a call to code construct 111 to implement behaviors 112 for markup code 104.

Figure 2:
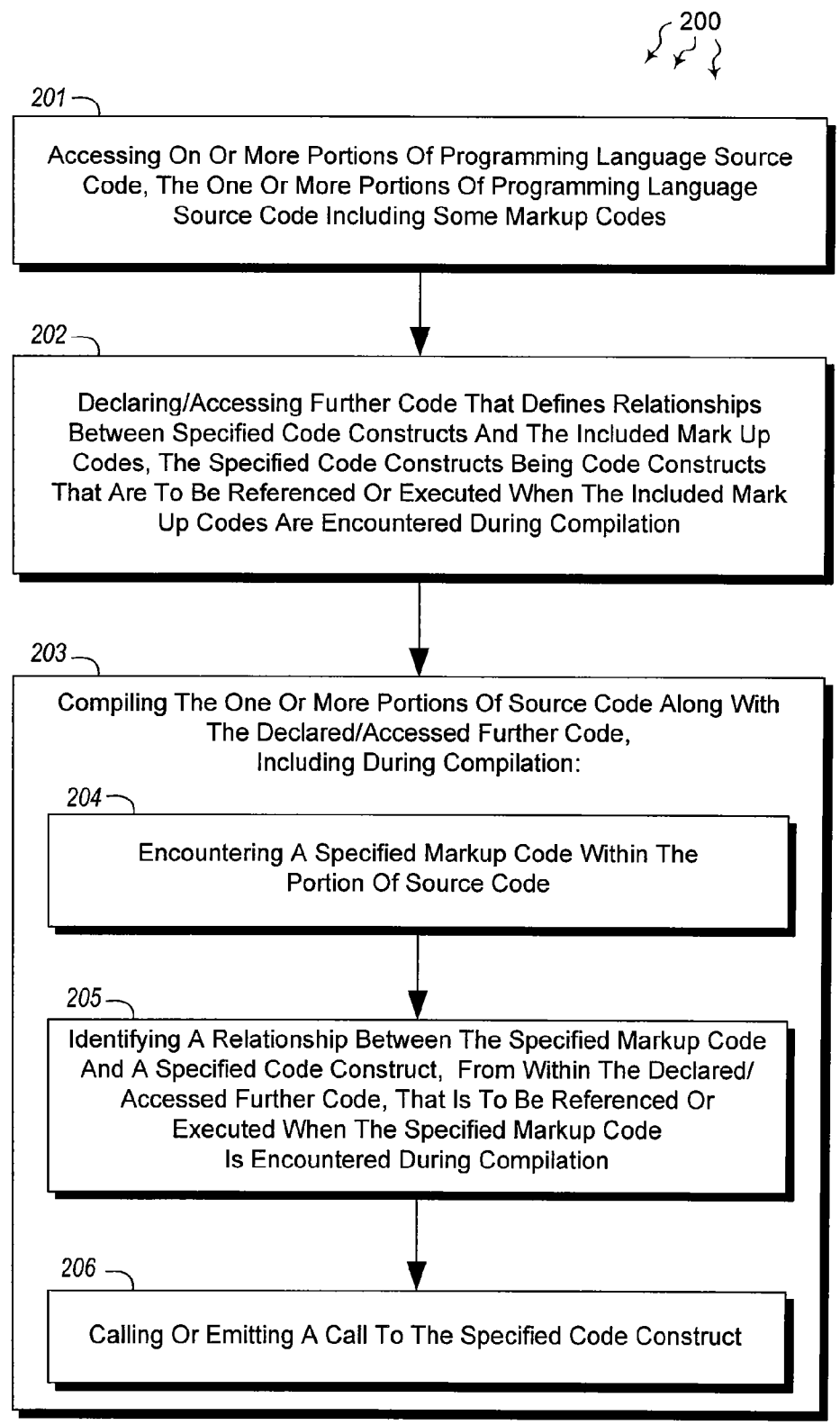
FIG. 2 illustrates a flow chart of an example method for interpreting markup codes at compile time.

FIG. 2 illustrates a flow chart of an example method 200 for interpreting markup codes at compile time. Method 200 will be described with respect to the components and data depicted in computer architecture 100.

Method 200 includes an act of accessing one or more portions of programming language source code, the one or more portions of programming language source code including some markup codes (act 201). For example, compiler 101 can access source code 102, including code portions 120A, 120B, etc. The code portions 120A, 120B, etc. include markup codes including markup codes 103, 104, 106, 107, etc.

Method 200 includes an act of declaring/accessing further code that defines relationships between specified code constructs and the included markup codes, the specified code constructs being code constructs that are to be referenced or executed when the included markup codes are encountered during compilation (act 202). In some embodiments, user 108 declares code 109 and then compiler 101 accesses code 109. In other embodiments, compiler 101 accesses code 109 at the request of user 108, even though user 108 is not the user that declared code 109.

As depicted, code 109 defines relationships between code constructs, such as, for example, 111, 113, etc., and markup codes, such as, for example, 104, 106, etc., in source code 102. Each code construct 111, 113, etc., is to be referenced or executed when the corresponding markup codes 104, 106, etc., are encountered respectively during compilation of source code 102. Each code construct can also represent one or more defined behaviors for interpreting the meaning or one or more corresponding markup codes. For example, behaviors 112 and 114 define how to interpret markup codes 104 and 106 respectively.

Method 200 includes an act of compiling the one or more portions of source code along with the declared/accessed further code (act 203). For example, compiler 101 can compile source 102 along with code 109.

During compilation, method 200 includes an act of encountering a specified markup code within the portion of source code (act 204). For example, during compilation of source code 102, complier 101 can encounter markup code 106 within source code 102.

During compilation, method 200 includes an act of identifying a relationship between the encountered markup code and a specified code construct, from within the declared/accessed further code, that is to be referenced or executed when the specified markup code is encountered during compilation (act 205). For example, during compilation of source code 102, complier 101 can identify a relationship between markup code 106 and code construct 113 within code 109. In this embodiment, code construct 113 is the code construct that is to be referenced or executed when markup code 106 is encounter during compilation.

During compilation, method 200 includes an act of calling or emitting a call to the specified code construct (act 206). For example, compiler 101 can call or emit a call to code construct 111. Calling or emitting a call to a code construct can cause behaviors of within the code construct to be invoked. For example, in response to calling or emitting a call to code construct 113, behaviors 114 can be implemented to interpret the meaning of markup code 106. Accordingly, the meaning of markup code 106 can be interpreted at compile time.

Subsequently, compiler 101 can output compiler results 121. Compiler results 121 include markup code behaviors 122. Markup code behaviors 122 can include the results of implementing defined behaviors for markup codes. In some embodiments, markup code behaviors 122 include further programming language instructions of a programming language (e.g., C#, C++, Visual Basic, etc.) representing the intent of encountered markup codes (e.g., XML codes, HTML codes, XHTML codes, etc.). The further programming language instructions can be then compiled into executable code.

In some embodiments, source code is annotated with "Handles" clauses to indicate which methods/classes should be invoked/created to deal with which XML-constructs/accessors. For each "Handles" clause, a compiler (e.g., compiler 101) generates a stub function. For example, if a function handles <tag>, then the compiler generates a stub function "xml$<tag>".

As such, when the compiler encounters an XML-construction expression, it treats this as a call to the corresponding stub function. For example, when the compiler encounters the XML tag construction <tag></tag>, it looks for a function "xml$<tag>" and emits a call to that function. Some forms of XML-construction include "Start constructing an element", "Add an attribute", "Add contents", "Add a sub-element", and "Finish constructing an element". Some forms of XML-accessors include "Get an attribute", "Get child elements", "Get descendent elements", and "Get elements by id".

Additionally, compile-time information about the specified code construct related to each markup code can be obtained. The compile time information can be used to provide feedback about markup code construction. In some embodiments, compile-time information related to a stub function, such as, for example, the stub function's type signature, the stub function's presence or absence, the stub function's documentation, etc., is used to provide immediate feedback about XML construction or access. For example, the stub function can provide compile-time error messages if given XML constructs cannot be performed, and can provide design-time intellisense about which XML constructs can be performed and their documentation.

Figure 3:
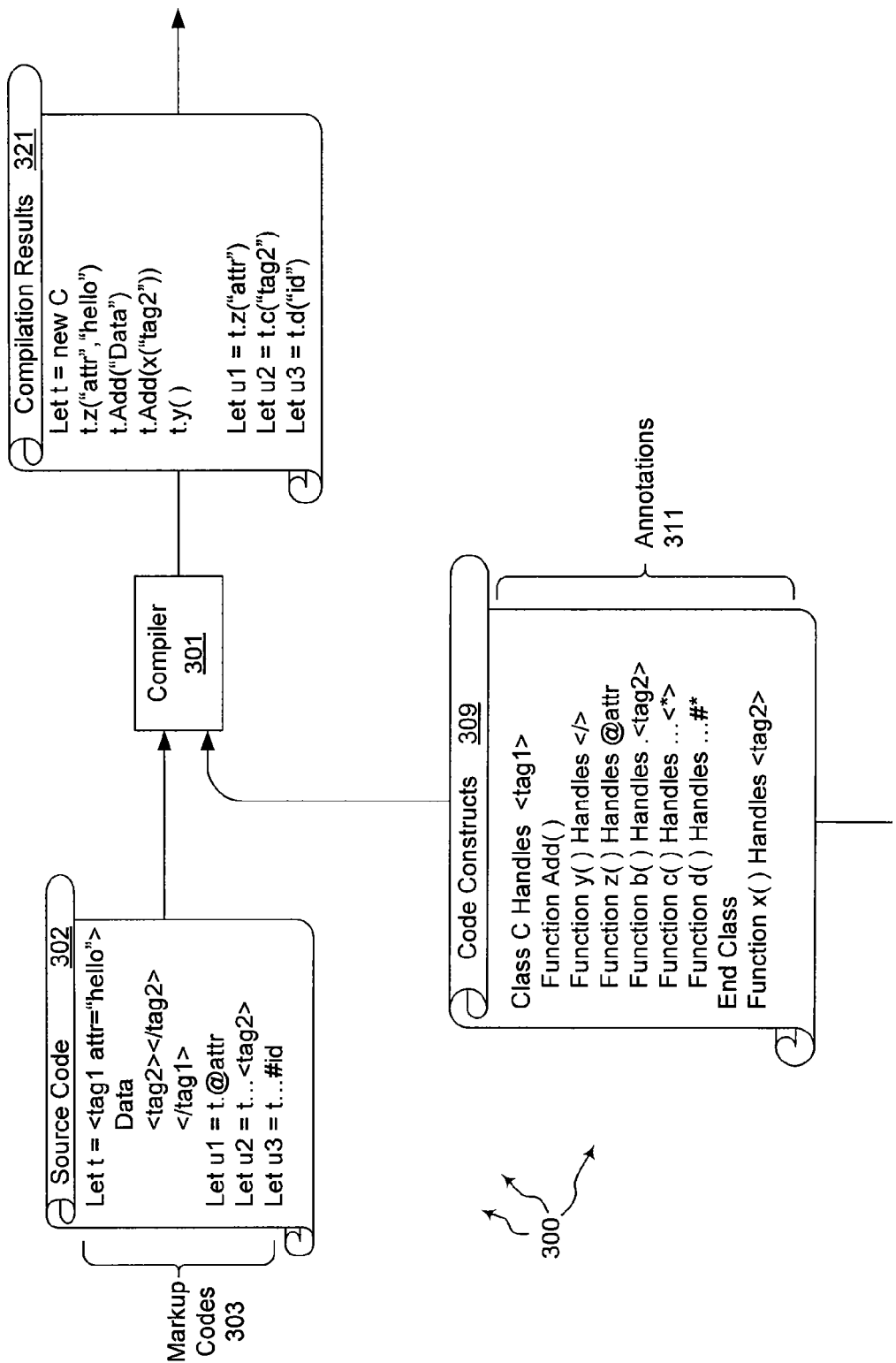
FIG. 3 illustrates another example computer architecture that facilitates compile time interpretation of markup codes.

FIG. 3 illustrates example computer architecture 300 that facilitates compile time interpretation of markup codes. As depicted, computer architecture 300 includes compiler 301, source code 302, code constructs 309, and compilation results 321.

As depicted, source code 302 includes markup codes 303. Code constructs 309 includes annotations 311. Annotations 311 indicate which Functions handle which markup codes. As such, compiler 301 can refer to code constructs 309 to identify appropriate behaviors when markup codes are encountered. Compilation results 321 represent how the intent of markup codes 302 is represented in source code based implemented behaviors from code constructs 309. For example, the intent of markup code "Let u3=t . . . #id" is represented in source code by "Let u3=t.d("id").

Accordingly, embodiments of the invention can be used to provide XML-construction and XML-query syntax for arbitrary language data types, such as Dictionaries and Lists, even for ones that don't look particularly XML-like. Embodiments of the invention can also be used to provide XML-construction and XML-query syntax for arbitrary XML-like data types. Embodiments of the invention can also be used to provide HTML-like syntax (e.g., XHTML syntax) and query syntax for HTML as well.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, a method for determining how to process markup codes within programming language source code when programming language source code is compiled, the method comprising:
   an act of accessing one or more portions of programming language source code, the one or more portions of programming language source code including some markup codes;
   an act of declaring further code that defines relationships between specified code constructs and the included markup codes, the specified code constructs being code constructs that are to be referenced or executed when the included markup codes are encountered during compilation; and
   an act of the processor compiling the one or more portions of source code along with the declared further code, including during compilation:
      an act of encountering a specified markup code within the portion of source code;
      an act of identifying a relationship between the specified markup code and a specified code construct, from within the declared further code, that is to be referenced or executed when the specified markup code is encountered during compilation; and
      an act of calling or emitting a call to the specified code construct.

2. The method as recited in claim 1, wherein act of accessing one or more portions of programming language source code comprises an act of accessing programming language source code including programming instructions from one or more of C#, C++, and Visual Basic.

3. The method as recited in claim 1, wherein at least one mark up code is from a markup language selected from among: XML, HTML, and XHTML.

4. The method as recited in claim 1, declaring further code that defines relationships between specified code constructs and the included markup codes comprises an act of formulating one or more annotations, the one or more annotations declaring programming language instructions that are to be utilized to process the meaning of the markup codes when the portion of programming language source code is compiled, each annotation corresponding to one or more specified markup codes.

5. The method as recited in claim 4, further comprising for each of the one or more annotations, an act of creating a stub function that is to be called during compilation of the one or more portions of programming language source code when a markup code corresponding to the annotation is encountered within a portion of programming source code, each stub function defining behaviors for one or more corresponding markup codes.

6. The method as recited in claim 5, wherein the act of identifying a relationship between the encountered markup code and a specified code construct comprises an act of identifying a stub function corresponding to the markup code.

7. The method as recited in claim 6, wherein the act of emitting a call to the code construct comprises an act of emitting a call to the identified stub function.

8. The method as recited in claim 4, further comprising an act of using compile time information related to the specified code construct as feedback about accessing or construction of the encountered markup code.

9. The method as recited in claim 1, wherein the act of encountering a markup code within the portion of source code comprises an act of encountering one of a XML-construction expression and an XML-accessor expression.

10. At a computer system including one or more processors and system memory, a method for determining how to process markup codes within programming language source code when programming language source code is compiled, the method comprising:

an act of accessing one or more portions of programming language source code, the one or more portions of programming language source code including some markup codes;

an act of accessing further code that defines relationships between specified code constructs and the included markup codes, the specified code constructs being code constructs that are to be referenced or executed when the included markup codes are encountered during compilation; and an act of the processor compiling the one or more portions of source code along with the accessed further code, including during compilation:

an act of encountering a specified markup code within one of the portions of source code;

an act of identifying a relationship between the specified markup code and a specified code construct, from within the accessed further code, that is to be referenced or executed when the specified markup code is encountered during compilation; and an act of calling or emitting a call to the specified code construct.

11. The method as recited in claim 10, further comprising an act of declaring the further code prior to accessing the further code.

12. The method as recited in claim 10, wherein act of accessing further code that defines relationships between specified code constructs and the included markup codes comprises an act of accessing binary code that defines the relationships.

13. The method as recited in claim 10, wherein the act of accessing further code that defines relationships between specified code constructs and the included markup codes comprises an act of accessing one or more annotations, the one or more annotations declaring programming language instructions that are to be utilized to process the meaning of the markup codes when the portion of programming language source code is compiled, each annotation corresponding to one or more specified markup codes.

14. The method as recited in claim 13, wherein the of accessing one or more annotations comprises an act of accessing one or more annotations referring to stub functions that are to be called during compilation of the one or more portions of programming language source code when a markup code corresponding to the annotation is encountered within a portion of programming source code, each stub function defining behaviors for one or more corresponding markup codes.

15. The method as recited in claim 14, wherein the act of identifying a relationship between the encountered markup code and a specified code construct comprises an act of identifying a stub function corresponding to the markup code.

16. The method as recited in claim 15, wherein the act of emitting a call to the specified code construct comprises an act of emitting a call to the identified stub function.

17. The method as recited in claim 13, further comprising an act of using compile time information related to the specified code construct as feedback about accessing or construction of the encountered markup code.

18. A computer system, the computer system comprising:
one or more processors;
system memory;
one or more computer storage media having stored thereon:
one or more portions of programming language source code, the one or more portions of programming language source code including XML markup codes, the XML markup codes including XML-construction expressions and XML-accessor expressions;
further code that defines relationships between handles annotation clauses and the XML markup codes, the handles annotations clauses for constructing calls to stub functions to implement defined behaviors for interpreting the meaning of the markup codes when the one or more portions of programming language source code is compiled; and
a compiler, the compiler configured to:
access the one or more portions of programming language source code;
access the further code; and
compile the one or more portions of source code along with the accessed further code, including during compilation:
encountering a specified markup code within one of the portions of source code;
identifying a relationship between the specified markup code and a specified code construct, from within the accessed further code, that is to be referenced or executed when the specified markup code is encountered during compilation; and
calling or emitting a call to the specified code construct.

19. The computer system as recited in claim 18, wherein the XML-construction expressions are selected from among expressions for: Start constructing an element, Add an attribute, Add contents, Add a sub-element, and Finish constructing an element.

20. The computer system as recited in claim 18, wherein the XML-accessor expressions are selected from among expressions for: Get an attribute, Get child elements, Get descendent elements, and Get elements by id.

* * * * *